United States Patent
Giesler et al.

(10) Patent No.: US 7,186,081 B2
(45) Date of Patent: Mar. 6, 2007

(54) AIR TURBINE STARTER ENHANCEMENT FOR CLEARANCE SEAL UTILIZATION

(75) Inventors: William L. Giesler, Phoenix, AZ (US); Todd A. Langston, Chandler, AZ (US); Marvin K. Collins, Chandler, AZ (US); Ronald A. Peck, Phoenix, AZ (US); David M. Mathis, Phoenix, AZ (US); Cynthia S. Byers, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/929,072

(22) Filed: Aug. 27, 2004

(65) Prior Publication Data
US 2006/0045739 A1 Mar. 2, 2006

(51) Int. Cl.
F03D 11/00 (2006.01)
(52) U.S. Cl. .................. 415/229; 415/122.1
(58) Field of Classification Search ............. 415/109, 415/111, 112, 122.1, 124.1, 124.2, 171.1, 415/174.5, 229, 230
See application file for complete search history.

(56) References Cited
U.S. PATENT DOCUMENTS

| 2,846,245 | A | 8/1958 | Weaver |
|---|---|---|---|
| 3,853,432 | A | 12/1974 | Cronsted |
| 5,003,767 | A | 4/1991 | Rodgers |
| 5,039,115 | A | 8/1991 | Hebert et al. |
| 5,538,258 | A | 7/1996 | Hager et al. |
| 5,636,848 | A | 6/1997 | Hager et al. |
| 6,059,085 | A | 5/2000 | Farnsworth |
| 6,558,114 | B1 | 5/2003 | Tapley et al. |
| 6,585,483 | B2 | 7/2003 | Feest |
| 6,629,816 | B2 | 10/2003 | Langston et al. |
| 6,681,579 | B2 * | 1/2004 | Lane et al. ............ 60/787 |
| 2003/0145602 | A1 | 8/2003 | Lane et al. |

FOREIGN PATENT DOCUMENTS

DE 3839843 5/1990

OTHER PUBLICATIONS

European Search Report EP 05255304.7, Feb. 22, 2006.

\* cited by examiner

*Primary Examiner*—Edward K. Look
*Assistant Examiner*—Dwayne J White
(74) *Attorney, Agent, or Firm*—Ingrassia Fisher & Lorenz (57) ABSTRACT

An air turbine starter (ATS) configured to couple to a gearbox, the ATS including an output shaft having an outer peripheral surface, a gearbox section, and an ATS section, the gearbox section configured to be disposed within, and coupled to, the gearbox and the ATS section configured to be disposed within the ATS, and a shield plate extending radially from the outer peripheral surface and coupled to the ATS section of the output shaft.

39 Claims, 4 Drawing Sheets

AIR TURBINE STARTER ENHANCEMENT FOR CLEARANCE SEAL UTILIZATION

TECHNICAL FIELD

The present invention relates to air turbine starters (ATS) and, more particularly, to an improved system for preventing and/or reducing oil leakage between an ATS and a gearbox.

BACKGROUND

An air turbine starter (ATS) is typically used to start an aircraft turbine engine, for example, a gas turbine jet engine. The ATS is typically mounted to the jet engine through a gearbox or other transmission assembly and a cover plate or wall is located between the starter and gearbox housings. The gearbox transfers power from the ATS to the engine to start the engine.

Many air turbine starters typically include lubricants, such as oil, to run properly. The lubricants are prevented from entering one or more areas of the gearbox or starter via one or more seals. In one exemplary gearbox configuration, a pressurized (or buffered) seal that is fed with a high pressure stream of air, for example, a labyrinth seal, is used to prevent oil from undesirably flowing out of the gearbox. Although this type of seal is generally effective, air flow from the pressurized seal may affect the ability of the ATS to maintain lubricant within its interior. This is particularly noted in configurations in which ATS seals, such as clearance seals, are used to keep lubricants inside the ATS.

Figure 1:
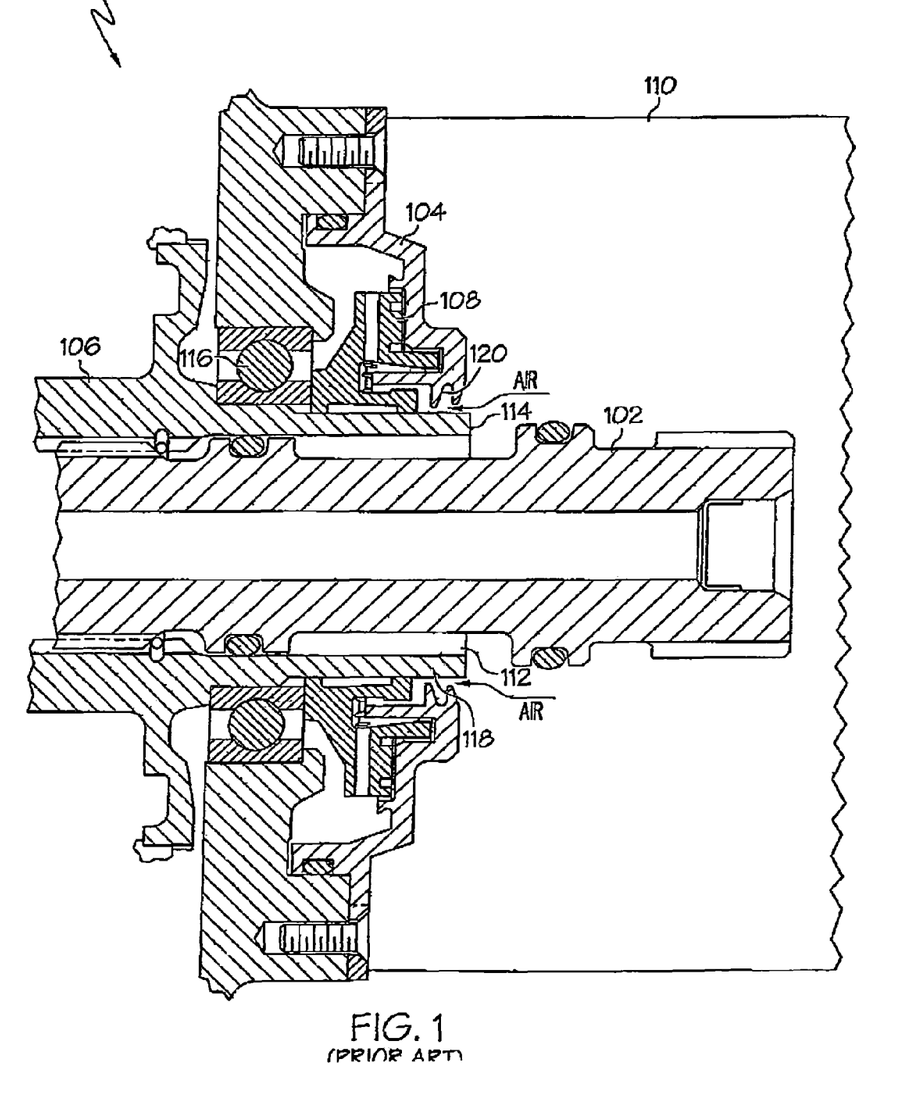
FIG. 1 is a cross sectional view of a section of an exemplary prior art ATS.

Turning to FIG. 1, a section of one such exemplary embodiment of an air turbine starter is shown. The section of the air turbine starter 100 shown includes an output shaft 102, a stator plate 104, drive shaft 106, and a clearance seal 108. The output shaft 102 is configured to couple to a gearbox 110 and to the drive shaft 106. The drive shaft 106 is generally a hollow cylinder and includes an end 114 that is generally flat and that has an opening 112 that allows the drive shaft 106 to at least partially mate with the output shaft 102. The stator plate 104 includes a shaft opening 118 that is defined by an inner wall 120 and that has a diameter sufficient to receive the drive shaft 106 and provide a gap between the stator plate 104 and drive shaft 106. The clearance seal 108 is press fit to the drive shaft 106. The clearance seal 108 forms a small clearance or plurality of small clearances between the seal 108 with the drive shaft 106 to create pressure differentials and air and oil flow patterns between the clearances that prevent leakage from the ATS 100 to the gearbox 110.

It has been found that when the exemplary ATS 100 of FIG. 1 is joined to a gearbox that uses the pressurized seal described above, a portion of the high pressure air, indicated by arrows in FIG. 1, may be diverted into the opening 118 between the stator plate 104 and the drive shaft 106. The high pressure air may cause disruption of the airflow patterns of the clearance seal 108, which in turn may cause oil from the ATS 100 to leak through the clearance seal 108. As a result, the clearance seal 108 may not operate as intended, and/or the ATS 100 may need to undergo more frequent maintenance.

Therefore, there is a need for an improved ATS that can operate more efficiently, and/or undergoes less maintenance and/or does not cause a clearance seal to leak fluid when operated with a pressurized seal. The present invention addresses one or more of these needs.

BRIEF SUMMARY

The present invention provides an air turbine starter (ATS) configured to couple to a gearbox. In one embodiment, and by way of example only, the ATS includes an output shaft and a shield plate. The output shaft has an outer peripheral surface, a gearbox section, and an ATS section. The gearbox section is configured to be disposed within, and coupled to, the gearbox and the ATS section configured to be disposed within the ATS. The shield plate extends radially from the outer peripheral surface and is coupled to the ATS section of the output shaft.

In another example, the ATS includes an output shaft, a shield plate, a drive shaft, and a stator plate. The output shaft has an outer peripheral surface, a gearbox section, and an ATS section. The gearbox section is configured to be disposed within, and coupled to, the gearbox and the ATS section is configured to be disposed within the ATS. The shield plate extends radially from the outer peripheral surface and is coupled to the ATS section of the output shaft. The drive shaft is disposed within the ATS. The drive shaft has an annular lip, a seal contact section. The annular lip has a first annular outer diameter and a substantially flat end that is disposed proximate the shield plate. The seal contact section has a second annular outer diameter and is coupled to the annular lip. Additionally, the second annular outer diameter is greater than the first annular outer diameter. The stator plate has a shaft opening formed therethrough. The shaft opening is defined by a cylindrical wall and has a predetermined inner diameter configured to provide a clearance for receiving the drive shaft annular lip between the cylindrical wall and the output shaft.

In yet another embodiment, and by way of example only, an air turbine starter (ATS) having an output shaft extending therethrough is provided. The ATS is configured to couple to a gearbox and includes a drive shaft and a stator plate. The drive shaft is disposed within the ATS and has an annular lip and a seal contact section. The annular lip has a first annular outer diameter and a substantially flat end. The end is disposed proximate the shield plate. The seal contact section has a second annular outer diameter and is coupled to the annular lip. The second annular outer diameter is greater than the first annular outer diameter. The stator plate has a shaft opening formed therethrough. The shaft opening is defined by a cylindrical wall and has a predetermined inner diameter configured to provide a clearance for receiving the drive shaft annular lip between the cylindrical wall and the output shaft.

In still yet another exemplary embodiment, a kit is provided for installing a system of preventing high pressure air from a gearbox from disrupting an operation of a clearance seal disposed around an output shaft in an air turbine starter (ATS). The kit includes a drive shaft and a stator plate. The drive shaft is disposed within the ATS and has an annular lip and a seal contact section. The annular lip has a first annular outer diameter and a substantially flat end. The end is disposed proximate the shield plate. The seal contact section has a second annular outer diameter and is coupled to the annular lip. The second annular outer diameter is greater than the first annular outer diameter. The stator plate has a shaft opening formed therethrough. The shaft opening is defined by a cylindrical wall and has a predetermined inner diameter configured to provide a clearance for receiving the drive shaft annular lip between the cylindrical wall and the output shaft.

In yet another exemplary embodiment, the ATS includes a drive shaft and a shield plate. The drive shaft has at least a first end and a second end, the drive shaft first end configured to couple to a turbine wheel. The shield plate is coupled to and extends radially from the drive shaft second end.

In yet another exemplary embodiment, the ATS includes an output shaft, drive shaft, shield plate, and a stator plate. The output shaft has a gearbox section and an ATS section. The gearbox section is configured to be disposed within, and coupled to, the gearbox and the ATS section is configured to be disposed within the ATS. The drive shaft is at least partially coupled to the output shaft and has at least a first end and a second end. The drive shaft first end is configured to couple to a turbine wheel. The shield plate is coupled to and extends radially from the drive shaft second end. The stator plate has a shaft opening formed therethrough. The shaft opening is defined by a cylindrical wall and has a predetermined inner diameter, wherein the drive shaft at least partially extends through the shaft opening between the cylindrical wall and the output shaft.

In still yet another exemplary embodiment, a kit is provided that includes a drive shaft and a shield plate. The drive shaft has at least a first end and a second end, the drive shaft first end configured to couple to a turbine wheel. The shield plate is coupled to and extends radially from the drive shaft second end.

In yet another exemplary embodiment, a kit is provided for installing a system of preventing high pressure air from a gearbox from disrupting an operation of a clearance seal disposed around an output shaft in an air turbine starter (ATS), where the ATS has a drive shaft having a first end and a second end and the drive shaft first end coupled to a turbine wheel. The kit includes a shield plate configured to coupled to the drive shaft second end.

Other independent features and advantages of the preferred ATS will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a specific type of rotating machine. Thus, although the present invention is, for convenience of explanation, depicted and described as being implemented in a turbine starter, it should be appreciated that it can be implemented in numerous other machines including, but not limited to, a gas turbine engine, an auxiliary power unit, a turbo charger, a super charger, an air cycle machine, an alternator, an electric motor, an electric generator, an integrated constant speed drive generator, gearboxes of any type, a hydraulic pump, a water pump, or various other chemical and industrial pumps.

Figure 2:
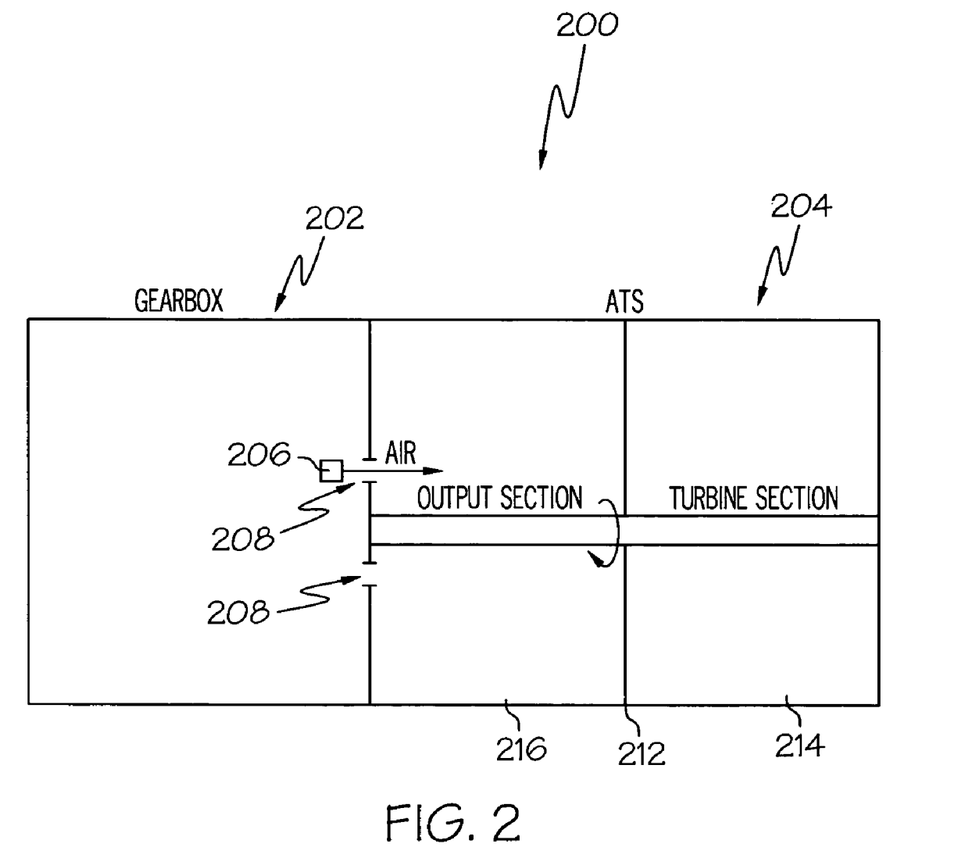
FIG. 2 is a schematic of an exemplary embodiment of an ATS assembly.

Turning now to the description, FIG. 2 schematically illustrates an exemplary air turbine starter assembly 200 that is used to initiate the rotation of a larger turbine, such as a turbofan jet engine. The air turbine starter assembly 200 includes a gearbox 202 and an air turbine starter (ATS) 204. The gearbox 202 includes a pressurized seal 206. The interior of the gearbox 202 is in fluid communication with oil flow passages within the ATS 204 via openings 208. The amount of oil that passes to the ATS 204 is controlled, in part, by the pressurized seal 206. The pressurized seal 206 may be any one of numerous types of seals that receives a flow of high pressure buffer air. Examples of suitable types of pressurized seals include, but are not limited to labyrinth seals, bushing seals, ring seals, floating ring seals, arch bound ring seals, brush seals, lip seals, finger seals, or alternatively air flow from bypass buffering or purge venting holes. Occasionally, the pressurized air from the pressurized seal 206 may impinge the interior of the ATS 204 via the openings 208.

The ATS 204 is enclosed within a housing assembly 212 that includes at least a turbine section 214 and an output section 216. The housing assembly 212 may be made up of two or more parts that are combined together or may be integrally formed as a single piece and may be coupled to the gearbox 202.

Figure 3:
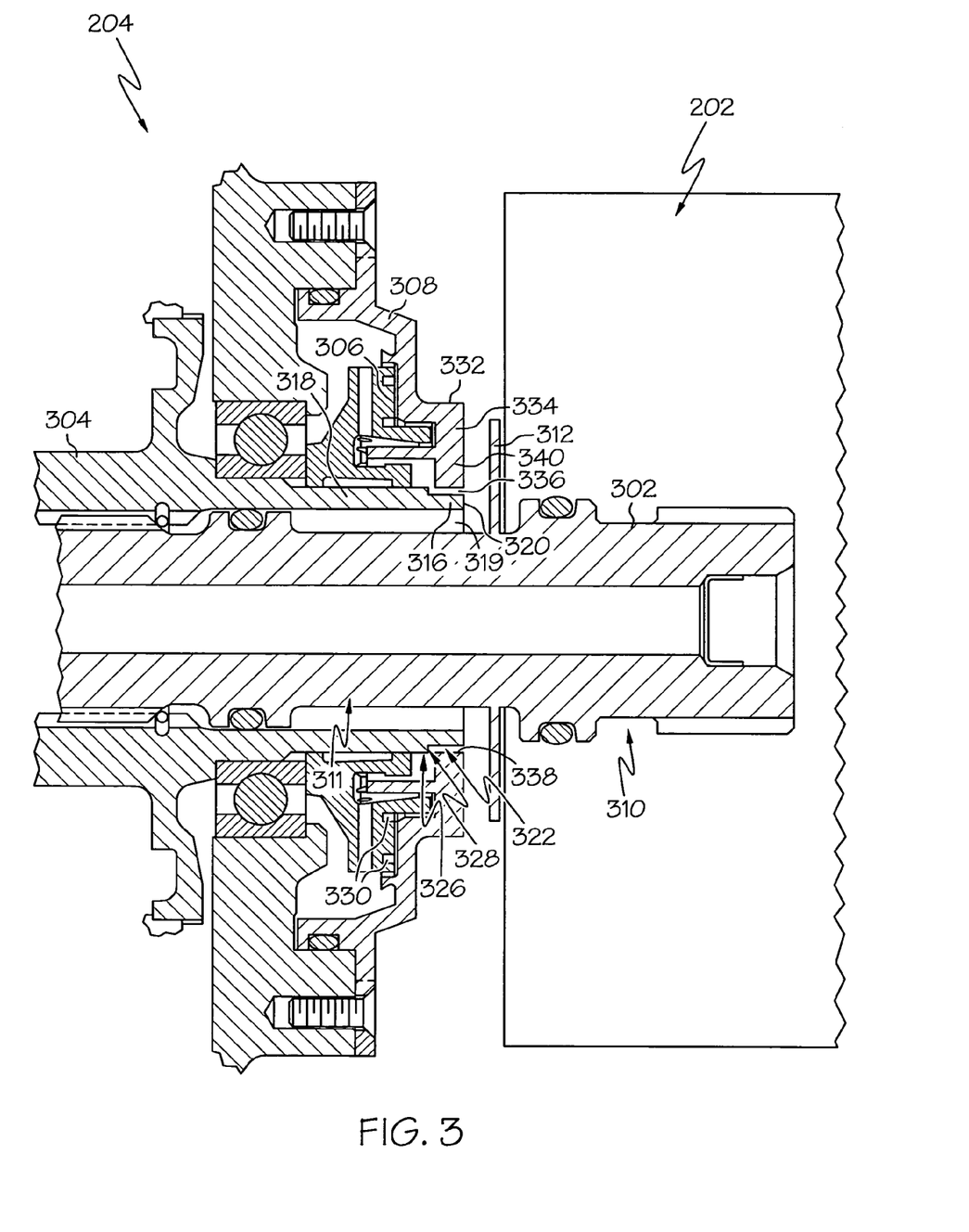
FIG. 3 is a close up view of a section of an exemplary ATS that may be used in the ATS assembly depicted in FIG. 2.

With reference to FIG. 3, a detailed description will now be provided of a portion of one exemplary embodiment of the ATS 204 that may be disposed within the output section 216. The illustrated portion of the ATS 204 includes a rotatable output shaft 302, a drive shaft 304, a clearance seal 306, and a stator plate 308. The output shaft 302 is configured to extend through the turbine section 214 and the output section 216, both shown in FIG. 2, and includes a gearbox section 310 and an ATS section 311. The gearbox section 310 is configured to be disposed within, and coupled to, the gearbox 202. The ATS section 311 is configured to be disposed within the ATS 204 and includes a shield plate 312 that extends radially from the outer peripheral surface of the output shaft 302.

The shield plate 312 is configured to be disposed between the gearbox 202 and the stator plate 308 and preferably extends over at least a portion of the stator plate 308, which will be described in further detail below, to thereby shield at least portions of the clearance seal 306 from air that may be directed therein by the gearbox 202. In one exemplary embodiment, the shield plate 312 is formed as part of the output shaft 302 during manufacture. In another exemplary embodiment, the output shaft 302 and shield plate 312 are separately manufactured and subsequently coupled to one another. For example, the shield plate 312 may be an appropriately sized spiral lock ring, a washer, cinch ring, or cinch washer and may be epoxied, glued, or otherwise suitably bonded to the output shaft 302 such that fluid does not leak between the shield plate 312 and the output shaft 302.

The drive shaft 304 is rotationally mounted within the ATS 204 and is coupled to the output shaft 302. The drive shaft 304 is hollow and has an inner diameter that is configured to mate with at least a portion of the output shaft 302. The drive shaft 304 also has a lip 316 that adjoins a seal contact section 318.

The lip 316 is configured to be disposed proximate the shield plate 312 when the drive shaft 304 and output shaft 302 are coupled to one another. The lip 316 includes an opening 319, an end surface 320, and an outer peripheral surface 322. The opening 319 is suitably sized to receive the output shaft 302. The end surface 320 is shaped to prevent fluid from flowing between the shield plate 312 and the stator plate 306. In this regard, it will be appreciated that the end surface 320 may be substantially flat, or alternatively, the end surface 320 may have any other shape suitable for minimum fluid deflection. The outer peripheral surface 322 is configured to further aid the end surface 320 to prevent fluid deflection and flow and is preferably substantially circular, however, as with the end surface 320, the outer peripheral surface 322 may have any one of numerous other shapes capable of working with the end surface 320 to provide optimal fluid deflection.

The seal contact section 318 is generally cylindrical and also has an outer peripheral surface 326. The seal outer peripheral surface 326 is preferably also generally circular and has a diameter that is greater than the diameter of the lip outer peripheral surface 322. As a result, a ledge 328 is formed between the two outer peripheral surfaces 322, 326.

The clearance seal 306 is mounted onto the seal contact section 318 of the drive shaft 304 and configured to seal oil within the ATS 204. In the depicted embodiment in FIG. 3, the clearance seal 306 includes a plurality of spaces 330 and non-illustrated ports that are circumferentially formed therein. During operation while the output shaft 302 and drive shaft 304 are spinning, any oil within the spaces 330 is driven towards the non-illustrated ports so that the oil is forced back into the ATS 204 via centrifugal force. As will be appreciated, any one of numerous types of clearance seals may be implemented including, but not limited to, the seals disclosed in U.S. Pat. No. 5,538,258, U.S. Pat. No. 5,636,848, and U.S. Pat. No. 6,629,816.

The clearance seal 306 is retained within the ATS 204 by the stator plate 308. The stator plate 308 makes up part of the ATS housing assembly output section 216 (shown in FIG. 2) and includes an annular channel 332 that opens toward the interior of the ATS 204 and that is formed to accommodate at least a portion of the clearance seal 306. Located radially inward from the annular channel 332 is a stator flange 334 having a shaft opening 336 formed substantially in the middle thereof. The stator flange 334 has an outer surface 340 that is configured to be flush with the lip end surface 320. The shaft opening 336, defined by a cylindrical wall 338, is configured to accommodate the output shaft 302 and drive shaft 304. The shaft opening 336 has an inner diameter configured to provide a close clearance for receiving the lip 316 between the cylindrical wall 338 and the output shaft 302 so that the output shaft 302 and drive shaft 304 do not contact the stator plate 308 during rotation.

As previously mentioned above, occasionally, high pressure air from the pressurized seal 206 may impinge the interior of the ATS 204. In such case, the shield plate 312, lip 316, and stator plate 308 work together to prevent high pressure air from affecting the operation of the clearance seal 306. If the high pressure air flows toward the shield plate 312, the air may be either redirected radially outward or returned toward the pressurized seal 210. Should at least a portion of the air flow by the shield plate 312 and toward the output shaft 302, the air will flow past the shaft opening 336, because the lip end surface 320 and stator plate outer surface 340 are flush with one another.

In the unlikely event that the air travels into the shaft opening 336, it may flow along the cylindrical wall 338 to the ledge 328, which deflects the air radially outward toward the stator plate 308. If in the highly unlikely event that the air contacts the stator plate 308, it will be deflected back toward the drive shaft 304 or may possibly flow toward the clearance seal 306. Because the air must travel a relatively arduous path in order to reach the clearance seal 306, the air loses pressure and does not detrimentally affect the performance of the clearance seal 306.

Figure 4:
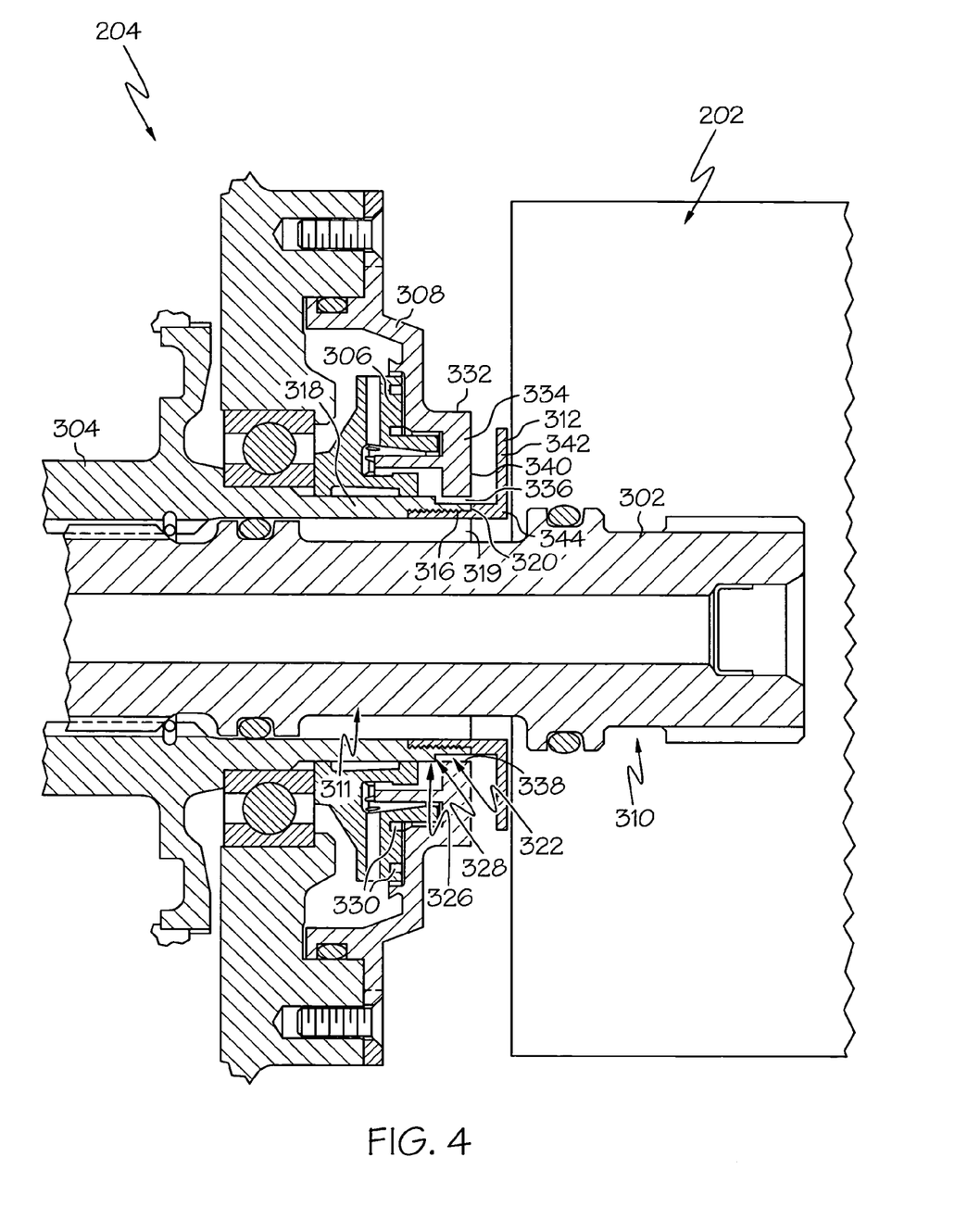
FIG. 4 is a close up view of a section of another exemplary ATS that may be used in the ATS assembly depicted in FIG. 2.

FIG. 4 illustrates another exemplary embodiment of the ATS 204 that may be disposed within the output section 216. Similar to the previous embodiment, the illustrated portion of the ATS 204 includes a rotatable output shaft 302, a drive shaft 304, a clearance seal 306, a stator plate 308, and a shield plate 312. However, the shield plate 312 in this embodiment extends radially from the drive shaft 304, instead of from the output shaft 302. In the depicted embodiment, the shield plate 312 has a shield section 342 and a shaft section 344. The shaft section 344 is configured to accommodate the lip end surface 320, such that the lip outer peripheral surface 322 and outer peripheral surface of the shaft section 344 are flush with one another. In this regard, a portion of the shaft section 344 is mated with the inner surface of the drive shaft 304. In the illustrated embodiment, the two are threadedly mated with one another. However, as will be appreciated by those with skill in the art, the drive shaft 304 and shield plate 312 may be coupled to one another by various other conventional methods, including, but not limited to, press fit, axial clamp by nut, loose-fit with anti-rotation notch or pins, mounted using an O-ring, and/or cinch ring mounted. In still another example, the shield plate 312 is formed on the drive shaft 304, wherein the lip end surface 320 is located on the shield plate 312.

Similar to the previous embodiment, when high pressure air from the pressurized seal 206 impinges the ATS 204, the shield plate 312, lip 316, and stator plate 308 work together to prevent high pressure air from affecting the operation of the clearance seal 306. If the high pressure air flows toward the shield plate 312, the air may be either redirected radially outward or returned toward the pressurized seal 210. However, in this embodiment, should at least a portion of the air flow by the shield plate 312 and toward the shield plate shaft section 344, the air will flow toward and deflect off of the drive shaft 304. Then, similar to above, in the unlikely event that the air travels into the shaft opening 336, the air may flow along the cylindrical wall 338 to the ledge 328, which deflects the air radially outward toward the stator plate 308. If in the highly unlikely event that the air contacts the stator plate 308, it will be deflected back toward the drive shaft 304 or may possibly flow toward the clearance seal 306.

As will be appreciated, a prior art ATS, such as the ATS 100 illustrated in FIG. 1, may be retrofitted with an output shaft, drive shaft, stator plate, and/or shield plate, each configured in accordance with the invention described above. These components may be provided as a kit. In one exemplary embodiment, the kit includes a drive shaft and stator plate, such as one of the drive shafts 304 and stator plates 308 described above. In another exemplary embodiment, the kit also includes an output shaft (such as the output shaft 302 above). In yet another exemplary embodiment, the kit includes a drive shaft 304 and a shield plate 312 according to the embodiments described above. The output shaft, drive shaft, and/or stator plate are implemented into the ATS 100 by conventional means which will not be described herein.

There has now been provided an improved air turbine starter that operates more efficiently, and/or undergoes less maintenance and/or does not cause a clearance seal to leak fluid when operated with a pressurized seal.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An air turbine starter (ATS) configured to couple to a gearbox, the ATS comprising:
   an output shaft having an outer peripheral surface, a gearbox section, and an ATS section, the gearbox section configured to be disposed within, and coupled to, the gearbox and the ATS section configured to be disposed within the ATS; and
   a shield plate extending radially from the outer peripheral surface and coupled to the ATS section of the output shaft.

2. The air turbine starter of claim 1 further comprising:
   a drive shaft disposed within the ATS, the drive shaft having an annular lip, a seal contact section, the annular lip having a first annular outer diameter and a substantially flat end, the end disposed proximate the shield plate, the seal contact section having a second annular outer diameter and coupled to the annular lip, wherein the second annular outer diameter is greater than the first annular outer diameter.

3. The air turbine starter of claim 2, further comprising:
   a stator plate having a shaft opening formed therethrough, the shaft opening defined by a cylindrical wall and having a predetermined inner diameter,
   wherein the drive shaft annular lip at least partially extends through the shaft opening and is disposed between the cylindrical wall and the output shaft.

4. The air turbine starter of claim 1, wherein the shield plate comprises one of a spiral lock ring, a washer, a cinch ring, and a cinch washer.

5. The air turbine starter of claim 1, wherein the ATS is configured to receive high pressure air from the gearbox and the shield plate is configured to deflect at least a portion of the air back to the gearbox.

6. The air turbine starter of claim 2, further comprising a clearance seal coupled to the drive shaft.

7. The air turbine starter of claim 1, wherein the gearbox comprises a high pressure air supply source.

8. The air turbine starter of claim 7, wherein the high pressure air supply source comprises one of a labyrinth seal, bushing seal, ring seal, floating ring seal, arch bound ring seal, brush seal, lip seal, finger seal, air flow from bypass buffering, and purge venting holes.

9. An air turbine starter (ATS) configured to couple to a gearbox, the ATS comprising:
   a stator plate having a shaft opening formed therethrough, the shaft opening defined by a cylindrical wall;
   an output shaft having an outer peripheral surface, a gearbox section, and an ATS section, the gearbox section configured to be disposed within, and coupled to, the gearbox and the ATS section configured to be disposed within the ATS and extending at least partially through the shaft opening;
   a shield plate extending radially from the outer peripheral surface and coupled to the ATS section of the output shaft; and
   a drive shaft coupled to the output shaft, the drive shaft having an annular lip and a seal contact section, the annular lip extending at least partially through the shaft opening between the output shaft and cylindrical wall, the annular lip having a first annular outer diameter and a substantially flat end, the end disposed proximate the shield plate, the seal contact section having a second annular outer diameter and coupled to the annular lip, wherein the second annular outer diameter is greater than the first annular outer diameter.

10. The air turbine starter of claim 9, wherein the shield plate comprises one of a spiral lock ring, a washer, a cinch ring, and a cinch washer.

11. The air turbine starter of claim 9, wherein the ATS is configured to receive high pressure air from the gearbox and the shield plate is configured to deflect at least a portion of the air back to the gearbox.

12. The air turbine starter of claim 9, further comprising a clearance seal coupled to the drive shaft and retained in the ATS by the stator plate.

13. The air turbine starter of claim 9, wherein the gearbox comprises a high pressure air supply source.

14. The air turbine starter of claim 13, wherein the high pressure air supply source comprises one of a labyrinth seal, bushing seal, ring seal, floating ring seal, arch bound ring seal, brush seal, lip seal, finger seal, air flow from bypass buffering, and purge venting holes.

15. An air turbine starter (ATS) having an output shaft extending therethrough, the ATS configured to couple to a gearbox and the output shaft having an outer peripheral surface, the ATS comprising:
   a stator plate having a shaft opening formed therethrough, the shaft opening defined by a cylindrical wall;
   a shield plate extending radially from the output shaft outer peripheral surface; and
   a drive shaft coupled to the output shaft, the drive shaft having an annular lip and a seal contact section, the annular lip extending at least partially through the shaft opening between the output shaft and cylindrical wall, the annular lip having a first annular outer diameter and a substantially flat end, the end disposed proximate the shield plate, the seal contact section having a second annular outer diameter and coupled to the annular lip, wherein the second annular outer diameter is greater than the first annular outer diameter.

16. The air turbine starter of claim 15, further comprising a clearance seal coupled to the drive shaft and retained in the ATS by the stator plate.

17. The air turbine starter of claim 15, wherein the gearbox comprises a high pressure air supply source.

18. The air turbine starter of claim 17, wherein the high pressure air supply source comprises one of a labyrinth seal, bushing seal, ring seal, floating ring seal, arch bound ring seal, brush seal, finger seal, air flow from bypass buffering, and purge venting holes.

19. An air turbine starter (ATS) configured to couple to a gearbox including an output shaft extending therethrough, the output shaft having an outer peripheral surface, and the ATS comprising:
   a shield plate extending radially from the output shaft outer peripheral surface; and
   a drive shaft disposed within the ATS, the drive shaft having an annular lip, a seal contact section, the annular lip having a first annular outer diameter and a substantially flat end, the end disposed proximate the shield plate, the seal contact section having a second annular outer diameter and coupled to the annular lip, wherein the second annular outer diameter is greater than the first annular outer diameter.

20. The ATS of claim 19, wherein
the output shaft has a gearbox section and an ATS section, the gearbox section is configured to be disposed within, and coupled to, the gearbox, and the ATS section is configured to be disposed within the ATS; and
the shield plate is coupled to the ATS section of the output shaft.

21. A kit for installing a system of preventing high pressure air from a gearbox from disrupting an operation of a clearance seal disposed around an output shaft in an air turbine starter (ATS), the kit comprising:
an output shaft having an outer peripheral surface, a gearbox section, and an ATS section, the gearbox section configured to be disposed within, and coupled to, the gearbox, and the ATS section configured to be disposed within the ATS;
a shield plate extending radially from the outer peripheral surface and counted to the ATS section of the output shaft;
a drive shaft disposed within the ATS, the drive shaft having an annular lip, a seal contact section, the annular lip having a first annular outer diameter and a substantially flat end, the end disposed proximate the shield plate, the seal contact section having a second annular outer diameter and coupled to the annular lip, wherein the second annular outer diameter is greater than the first annular outer diameter; and
a stator plate having a shaft opening formed therethrough, the shaft opening defined by a cylindrical wall and having a predetermined inner diameter configured to provide a clearance for receiving the drive shaft annular lip between the cylindrical wall and the output shaft.

22. The kit of claim 21, wherein the shield plate comprises one of a spiral lock ring, a washer, a cinch ring, and a cinch washer.

23. The kit of claim 21, wherein the shield plate is configured to deflect at least a portion of the air back to the gearbox.

24. An air turbine starter (ATS) configured to couple to a gearbox, the ATS comprising:
a drive shaft having at least a first end and a second end, the drive shaft first end configured to couple to a turbine wheel;
a stator plate having a shaft opening formed therethrough, the shaft opening defined by a cylindrical wall and having a predetermined inner diameter configured to provide a clearance for receiving the drive shaft annular lip; and
a shield plate coupled to and extending radially from the drive shaft second end and configured to be disposed between the stator plate and the gearbox.

25. The air turbine starter of claim 24, wherein:
the shield plate includes a shaft section and a shield section, the shaft section coupled to the drive shaft and having an outer surface, and the shield section extending radially from the outer surface of the shaft section.

26. The air turbine starter of claim 24 wherein:
the chive shaft has an annular lip and a seal contact section, the annular lip having a first annular outer diameter, the seal contact section having a second annular outer diameter and coupled to the annular lip; and
the second annular outer diameter is greater than the first annular outer diameter.

27. The air turbine starter of claim 26, wherein the ATS further comprises:
an output shaft having an outer peripheral surface, a gearbox section, and an ATS section, the gearbox section configured to be disposed within, and coupled to, the gearbox and the ATS section configured to be disposed within the ATS; and
the drive shaft annular lip at least partially extends through the shaft opening between the cylindrical wall and the output shaft.

28. The air turbine starter of claim 24, wherein:
the ATS is configured to receive high pressure air from the gearbox; and
the shield plate is configured to deflect at least a portion of the air back to the gearbox.

29. The air turbine starter of claim 24, further comprising a clearance seal coupled to the drive shaft.

30. The air turbine starter of claim 24, wherein the gearbox comprises a high pressure air supply source.

31. The air turbine starter of claim 30, wherein the high pressure air supply source comprises one of a labyrinth seal, bushing seal, ring seal, floating ring seal, arch bound ring seal, brush seal, lip seat finger seal, air flow from bypass buffering, and purge venting holes.

32. An air turbine starter (ATS) configured to couple to a gearbox, the ATS comprising:
an output shaft having a gearbox section and an ATS section, the gearbox section configured to he disposed within, and coupled to, the gearbox and the ATS section configured to be disposed within the ATS;
a drive shaft at least partially coupled to die output shaft, the drive shaft having at least a first end and a second end, the drive shaft first end configured to couple to a turbine wheel; and
a shield plate coupled to and extending radially from the drive shaft second end; and
a stator plate having a shalt opening formed therethrough, the shaft opening defined by a cylindrical wall and having a predetermined inner diameter, wherein the drive shaft at least partially extends through the shaft opening between the cylindrical wall and the output shaft.

33. The air turbine starter of claim 32, wherein:
the ATS is configured to receive high pressure air from the gearbox; and
the shield plate is configured to deflect at least a portion of the air back to the gearbox.

34. The air turbine starter of claim 32, farther comprising a clearance seal coupled to the drive shaft.

35. The air turbine starter of claim 32, wherein the gearbox comprises a high pressure air supply source.

36. The air turbine starter of claim 35, wherein the high pressure air supply source comprises one of a labyrinth seal, bushing seal, ring seal, floating ring seal, arch bound ring seal, brush seal, lip seal, finger seal, air flow from bypass buffering, and purge venting holes.

37. A kit for installing a system of preventing high pressure air from a gearbox from disrupting an operation of a clearance seal disposed around an output shaft in an air turbine starter (ATS), the output shaft extending between the ATS and the gearbox through an opening formed in a stator plate mounted to the ATS, the kit comprising:
a drive shaft configured to be disposed concentric to the output shaft and extend at least partially through the stator plate opening, the drive shaft having at least a first end and a second end, the drive shaft first end configured to couple to a turbine wheel; and a shield plate coupled to and extending radially from the drive shaft second end, the shield plate configured to be disposed between the stator plate and the gearbox.

38. The kit of claim 37, wherein:

the drive shaft has an annular lip from which the shield plate extends and a seal contact section, the annular lip having a first annular outer diameter, the seal contact section having a second annular outer diameter and coupled to the annular lip; and the second annular outer diameter is greater than the first annular outer diameter.

39. A kit for installing a system of preventing high pressure air from a gearbox from disrupting an operation of a clearance seal disposed around an output shaft in an air turbine starter (ATS), the output shaft extending between the ATS and the gearbox through an opening formed in a stator plate mounted to the ATS, the ATS having a drive shaft having a first end and a second end, the drive shaft first end coupled to a turbine wheel, the kit comprising:

a shield plate configured to couple to the drive shaft second end, the shield plate configured to be disposed between the stator plate and the gearbox.

* * * * *

UNITED STATES PATENT AND TRADEMARK OFFICE
CERTIFICATE OF CORRECTION

PATENT NO. : 7,186,081 B2 Page 1 of 1
APPLICATION NO. : 10/929072
DATED : March 6, 2007
INVENTOR(S) : William L. Giesler et al.

It is certified that error appears in the above-identified patent and that said Letters Patent is hereby corrected as shown below:

Column 7, line 58, "shalt" should be changed to --shaft--.
Column 9, line 20, "counted" should be changed to --coupled--;
Column 9, line 61, "chive" should be changed to --drive--.
Column 10, line 23, "seat" should be changed to --seal--;
Column 10, line 28, "he" should be changed to --be--;
Column 10, line 31, "die" should be changed to --the--;
Column 10, line 37, "shalt" should be changed to --shaft--;
Column 10, line 49, "farther" should be changed to --further--.

Signed and Sealed this

Fifth Day of June, 2007

JON W. DUDAS
*Director of the United States Patent and Trademark Office*